UNITED STATES PATENT OFFICE 2,212,099

ART OF PREPARING METHYL HALIDE DERIVATIVES OF AROMATIC HYDROCARBONS

Franklin D. Jones, Llanerch, Pa., assignor to American Chemical Paint Company, Ambler, Pa., a corporation of Delaware No Drawing. Application April 25, 1938, Serial No. 204,215

7 Claims. (Cl. 260—649)

This invention relates to the art of preparing methyl halide derivatives of aromatic hydrocarbons, and has particular reference to the chlormethylation and brom-methylation of aromatic hydrocarbons.

The aromatic hydrocarbon may be a single-ringed hydrocarbon such as benzene and its homologues such as toluene, xylene, cymene, etc., a double-ringed hydrocarbon such as naphthalene and its derivatives such as methyl naphthalene, ac-tetrahydronaphthalene, etc., or a three-ringed hydrocarbon such as anthracene and phenanthrene and their derivatives such as the methyl or ethyl derivatives. By the term "chlormethylation" is meant the introduction into the aromatic ring of a side chain consisting of $CH_2Cl$. Likewise, by the term "brom-methylation" is meant the introduction into the aromatic ring of a side chain consisting of $CH_2Br$. Hence, it may be stated that the invention concerns the introduction into the ring of an aromatic hydrocarbon of a side chain consisting of $CH_2X$, wherein X is either Cl or Br.

The method of the invention in its essential details consists in heating the aromatic hydrocarbon to be chlormethylated or brom-methylated with formaldehyde or one of its derivatives such as paraformaldehyde or trioxymethylene and concentrated aqueous hydrochloric or hydrobromic acid in a medium of glacial acetic acid under suitably controlled reaction conditions. The glacial acetic acid appears to act as a vehicle, medium or homogenizer for the reagents, and can readily be recovered for reuse.

I am aware that prior to this invention it was proposed to produce 1-naphthyl methyl chloride by mixing trioxymethylene with glacial acetic acid, passing in a current of dry hydrogen chloride, adding naphthalene and heating the mixture for about twenty hours. The proposed prior art method has the disadvantages that the yield is poor (about 21%), and that considerable amounts of undesirable products such as di-chlormethyl naphthalene and di-naphthyl methane are also formed.

The present invention is based in part upon the discovery that the yield of mono-chlormethyl naphthalene can be substantially increased and the amounts of undesirable by-products can be substantially eliminated by employing aqueous hydrochloric acid instead of dry hydrogen chloride.

The following is given as an illustrative method for preparing methyl halide derivatives of naphthalene:

128 grams of naphthalene, 40 grams of trioxymethylene, 500 grams of 99% glacial acetic acid and 130 c. c. of concentrated hydrochloric acid (36–38%) are thoroughly mixed together. The temperature of the reaction mixture is raised to 60–65° C. while the mixture is stirred. The temperature is maintained at this range for about six hours, at which time an additional amount of concentrated hydrochloric acid (70 c. c.) is added. The heating at 60–65° C. is continued for about eighteen more hours; the mixture is then cooled and poured into 1.5 liters of water. The heavy oil which separates is decanted off, and the remainder is washed with ether and benzene. The oil and the ether-benzene extract are mixed, washed with a 10% solution of sodium carbonate, concentrated and distilled under vacuum to recover the unused naphthalene and the chlormethylated naphthalene. About 105–110 grams of 1-naphthyl methyl chloride are obtained at 134–135° C. under 5 mm. pressure. The yield amounts to about 60–65% on the total naphthalene contained in the reaction mixture, or 90–95% on the naphthalene actually used. The product can be crystallized from petroleum ether with the aid of a freezing mixture, and has a melting point of 32° C. There is a light brown residue, which appears to be chiefly di-naphthyl methane.

A variation in the foregoing illustrative method consists in adding all of the hydrochloric acid to the reaction mixture at once instead of in two portions. The yield appears to be somewhat better if the hydrochloric acid is added in two portions.

Another variation consists in using aqueous formaldehyde (30–40% solution) instead of trioxymethylene.

If 1-methyl naphthalene is used instead of naphthalene in the foregoing example, the product obtained is 1-methyl:4-chlormethyl naphthalene. With 2-methyl naphthalene, the product is 1-chlormethyl: 2-methyl naphthalene. If ac-tetrahydronaphthalene, also known as 1,2,3,4-tetrahydronaphthalene and tetralin, is employed instead of naphthalene, 6-chlormethyl tetrahydronaphthalene is obtained. If phenanthrene is chlormethylated, the resulting product is 9-chlormethyl phenanthrene. From the foregoing facts, it is thought to be clear that the new chlormethyl side chain goes into the most active position of the aromatic ring.

It is to be particularly noted that a mole of the aromatic hydrocarbon to be chlormethylated is employed in the process. This, in the illustrative procedure wherein naphthalene is the primary reagent, 128 grams of naphthalene are employed. In the case of benzene, 78 grams are used, in the case of toluene, 92 grams are used, and in the case of anthracene or phenanthrene, 178 grams are used. The proportions of the other reagents are substantially the same as indicated in the illustrative procedure. In the case of phenanthrene, the process yields about 110 grams of 9-chlormethyl phenanthrene in the form of colorless crystals, melting at 72° C., and distilling at 215° C. under 6 mm. pressure. This represents a yield of about 49%. Only a few grams of unchanged phenanthrene are recovered, the balance being tar.

The process of the invention has been illustrated with particular reference to the chlormethylation of aromatic hydrocarbons, but it is just as applicable to the brom-methylation of these compounds. To produce the methyl bromine derivatives, it is merely necessary to substitute aqueous hydrobromic acid for the hydrochloric acid in the illustrative procedure.

The method of the present invention has important commercial possibilities, because of the fact that the mono-chlormethylated aromatic hydrocarbons constitute an important class of intermediates in the manufacture of dyestuffs and pharmaceuticals. For instance, 1-naphthyl methyl chloride or bromide can be readily converted to the cyanide and then hydrolyzed to alpha or 1-naphthalene acetic acid, which has important applications as a plant hormone. The 1-naphthalene acetic acid produced in this manner has a melting point of 135° C. and is purer than any previously reported in the literature.

The foregoing disclosure embodies the essential and distinctive thought of the invention, but it will, of course, be understood that the same may be modified in various ways and combined with various other steps or details without departing from the spirit of the invention or the scope of the appended claims, in which I intend to claim all patentable novelty inherent in the invention which is permissible in view of he prior art. It will, further, be understood that the invention is not dependent upon any explanations or theories which have been set forth as descriptive of the actions or reactions involved, nor dependent upon the soundness or accuracy of any theoretical statements so advanced.

I claim:

1. The method of introducing into the ring of an aromatic hydrocarbon a side chain consisting of $CH_2X$, wherein X is a member of the group consisting of Cl and Br, which consists in heating the hydrocarbon under controlled reaction conditions with formaldehyde and aqueous HX, wherein X is a member of the group consisting of Cl and Br, in a medium consisting of glacial acetic acid.

2. The method of chlormethylating naphthalene, which consists in heating naphthalene, formaldehyde and concentrated aqueous hydrochloric acid in a medium consisting of glacial acetic acid under controlled reaction conditions.

3. The method of chlormethylating naphthalene, which consists in mixing a mole of naphthalene, 500 grams of glacial acetic acid, 40 grams of trioxymethylene and 130 c. c. of concentrated aqueous hydrochloric acid, heating the mixture at about 60–65° C. for about six hours, adding 70 c. c. of concentrated aqueous hydrochloric acid, continuing the heating for about eighteen hours, and finally separating the chlormethylated product from the reaction mixture.

4. The method of preparing 1-naphthyl methyl chloride, which consists in mixing naphthalene, formaldehyde, aqueous hydrochloric acid and glacial acetic acid, heating the mixture for about twenty-four hours, and finally separating the 1-naphthyl methyl chloride from the reaction mixture.

5. The method of brom-methylating naphthalene, which consists in heating naphthalene, formaldehyde and concentrated aqueous hydrobromic acid in a medium consisting of glacial acetic acid under controlled reaction conditions.

6. The method of chlormethylating ac-tetrahydronaphthalene, which consists in heating ac-tetrahydronaphthalene, formaldehyde and concentrated aqueous hydrochloric acid in a medium consisting of glacial acetic acid under controlled reaction conditions.

7. The method of introducing into the ring of an aromatic hydrocarbon a side chain consisting of $CH_2X$, wherein X is a member of the group consisting of Cl and Br, which consists in heating the hydrocarbon under controlled reaction conditions with a substance selected from the group consisting of formaldehyde, paraformaldehyde and trioxymethylene and with aqueous HX, wherein X is a member of the group consisting of Cl and Br, in a medium consisting of glacial acetic acid.

FRANKLIN D. JONES.